United States Patent [19]

Bossler, Jr.

[11] Patent Number: 5,178,028
[45] Date of Patent: Jan. 12, 1993

[54] OFFSET FACE GEAR TRANSMISSION

[75] Inventor: Robert B. Bossler, Jr., Hacienda Heights, Calif.

[73] Assignee: Lucas Western, Inc., City of Industry, Calif.

[21] Appl. No.: 879,130

[22] Filed: May 5, 1992

Related U.S. Application Data

[63] Continuation-in-part of Ser. No. 590,360, Sep. 27, 1990, abandoned.

[51] Int. Cl.$^5$ .............................................. F16H 37/06
[52] U.S. Cl. ...................................... 74/416; 74/661; 74/665 B; 74/665 D; 74/665 GC
[58] Field of Search ............ 74/416, 417, 661, 665 A, 74/665 B, 665 C, 665 D, 665 E, 665 GA, 665 GB, 665 GC, 665 H, 410, 665 P

[56] References Cited

U.S. PATENT DOCUMENTS

| | | | |
|---|---|---|---|
| 2,293,279 | 8/1942 | Chilton et al. | 74/665 GB |
| 2,479,406 | 8/1949 | Rapuano | 74/661 |
| 2,486,671 | 11/1949 | Normann | 74/417 |
| 2,749,764 | 6/1956 | Chou | 74/416 |
| 2,865,219 | 12/1958 | Allen | 74/410 |
| 3,225,615 | 12/1965 | Little | 74/416 |
| 3,871,248 | 3/1975 | Barish | 74/417 |
| 4,297,907 | 11/1981 | Bossler | 74/417 |
| 4,437,355 | 3/1984 | Bordat | 74/385 |
| 4,489,625 | 12/1984 | White | 74/665 BX |
| 4,983,153 | 1/1991 | Luijten | 475/343 |

OTHER PUBLICATIONS

Robert C. Bill, Advanced Rotorcraft Transmission Program, pp. 229, 237, presented at 46th Annual Forum of American Helicopter Society, May 21-23, 1990, Washington, D.C.

D. G. Lewicki, AVSCOM Technical Memorandum 90-C-006, pp. 4, 5 presented at Helicopter Transmission Design and Maintenance Workshop, May 21-25, 1990, Quebec City, Canada.

Primary Examiner—Leslie A. Braun
Assistant Examiner—William O. Trousdell
Attorney, Agent, or Firm—Pretty, Schroeder Brueggemann & Clark

[57] ABSTRACT

A gear arrangement for an offset transmission includes two concentric, counter-rotating face gears in meshing engagement with an engine output shaft, the face gears being connected to respective concentric, vertical counter rotating face gear shafts of unequal length, each shaft ending in a helical spur gear that is in meshing engagement with an output helical face gear. The helical output face gear is connected to the output shaft, thereby completing the offset transmission. The face gear shafts can be coupled together by means of thrust bearings that couple the axial thrusts of one shaft to the other in an opposite direction. The shafts can also be coupled via a preload spring that ensures the torque split between the pinion gears is statically determinant. The gear arrangement can be applied to twin engine designs, with a spur gear train coupling the two engines together via an interconnect shaft.

18 Claims, 4 Drawing Sheets fig. 1.

OFFSET FACE GEAR TRANSMISSION

This application is a continuation-in-part of application Ser. No. 07/590,360, filed Sep. 27, 1990 now abandoned.

BACKGROUND OF THE INVENTION

1. Field of the Invention

This invention relates generally to gear arrangements for transmitting torque through an angle and, more particularly, to gear arrangements for transmitting torque from an engine shaft to a parallel offset output shaft.

2. Description of the Related Art

A variety of gear arrangements have been used for transmitting torque from an engine shaft to an offset driving shaft, which requires transmitting torque twice through an angle. That is, the torque must make two approximately 90° turns such that the engine shaft and the driving shaft rotate about parallel but offset axes. The requirement of making two 90° turns, or turning the corner twice, adds complexity to the gear arrangement. Conventionally, the offset is made using bevel gears or a train of spur or helical gears, often in conjunction with planetary gear stages for speed reduction.

Bevel gears comprise gear wheels with straight teeth that mesh at an angle. That is, the top edges of the gear teeth are inclined relative to the axis of rotation and define a cone. Spiral bevel gears are also commonly used to turn a corner, and have curved teeth that mesh at an angle. The ratio of teeth on the various gear wheels, resulting in differences in speed, is referred to as the speed reduction ratio. Spiral bevel gears can transfer a great amount of torque for their size and are used, for example, in a typical automobile differential to transmit torque from a drive shaft to a rear axle. Spiral bevel gears are also used in conventional helicopter transmissions, where rotor blades must rotate about an axis that is approximately perpendicular to the helicopter engine shaft. While spiral bevel gears are especially suited for transmitting large amounts of torque through angles, they do have drawbacks.

Spiral bevel gears are extremely sensitive to changes in the relative location of the gears. In fact, spiral bevel gears are often located to a tolerance of thousandths of an inch. Thus, spiral bevel gears are adversely effected by small amounts of thermal growth during operation and by deflections of the gear supporting structure under load. Therefore, the gears may not maintain an optimum mesh through changes in temperature and deflections of the supporting structure. This sensitivity limits the speed reduction ratios for which spiral bevel gears can be advantageously employed. Such sensitivity also means that spiral bevel gears require complex manufacturing, assembly, and gear mating procedures, and consequently are more expensive to employ than simpler gear arrangements. The sensitivity to minute changes in relative position also requires a heavy and complex support structure for spiral bevel gears.

Because maintaining optimum mesh is so critical to high speed operation, spiral bevel gears are more readily suited to low speed reduction ratios (ratios less than two-to-one) and are less suited to high speed reduction ratios (greater than four-to-one). It can easily be necessary to use a complicated gear arrangement to achieve overall gear reduction ratios of ten-to-one or more. For example, the required overall speed reduction is often obtained using a combination of bevel gears for turning the corner and also planetary gears for speed reduction.

Gear arrangements using a spur gear pinion/face gear combination for turning a corner are much more forgiving of changes in relative size and position than spiral bevel gears. A spur gear is a gear wheel with straight radial teeth on its circumference, the teeth edges being parallel to the axis of rotation and defining a cylinder. A face gear is a gear wheel having an axis of rotation perpendicular to that of the spur gear and having teeth on its face along the wheel periphery, the teeth being radially directed toward the center of the wheel. Alternatively, the spur gear and face gear can have helical teeth, in which the teeth edges are straight but are inclined from the axial and radial direction, respectively. In either case, the top edges of the face gear teeth define a plane rather than the spiral bevel gear cone.

A spur gear can move in and out freely along its axis of rotation, within the limits of the length of its teeth, without negative effects on meshing with the face gear. Furthermore, a spur gear has more tolerance for movement toward or away from its driven face gear than does an equivalent spiral bevel gear arrangement. Thus, gear arrangements using a spur gear and face gear to turn a corner are relatively unaffected by the thermal growth and deflection of the supporting structure experienced in many applications. For this reason, such gear arrangements easily accommodate speed reduction ratios greater than four-to-one.

Spur/face gear combinations exhibit true conjugate action in the presence of small deflections and misalignments. Therefore, for a spur/face gear combination, the velocity of the driven gear remains constant as the teeth go through meshing engagement, resulting in relatively quiet and vibration free operation. Spiral bevel gears do not exhibit conjugate action in the presence of equivalent deflections and misalignments. Therefore the velocity of the driven gear experiences minute acceleration and deceleration as the teeth go through meshing engagement, and manifests itself as objectionable noise and vibration.

A spiral bevel gear stage can be used to transfer the torque around the corners, ordinarily with less than a two-to-one speed reduction ratio, and a spur gear and/or planetary gear stage can be used for the remaining speed reduction to achieve the overall ratio desired. Unfortunately, such gear arrangements can be rather complex, requiring many gear stages and supporting bearings. Such planetary gear stages where an aircraft engine turns propeller blades, for example, can have as many as ten gears and twelve to fifteen bearings. Each one of these gear stages and bearings presents a possible failure mode for the system, decreasing the reliability while increasing the complexity, cost, weight, and associated problems.

Thus, there is a need for a compact gear arrangement that can transmit large amounts of torque through an offset path while accommodating thermal growth and deflection of the supporting structure, with reduced vibration and noise, capable of operating at large speed reduction ratios, while minimizing the number of gear stages and supporting structure for reduced weight and greater reliability. The present invention satisfies this need.

SUMMARY OF THE INVENTION

The present invention provides a gear arrangement for transmitting torque from an input engine shaft to an offset output driving shaft, the gear arrangement having an upper gear means at the input connected to the engine shaft for turning the corner and dividing the engine torque equally between two upper gear wheels, a lower gear means at the output for combining the torque from the two upper gear wheels and connected to the output driving shaft for turning the corner, and concentric, rotating vertical shafts connected to the upper and lower gear means. Thus, the output driving shaft rotates about an axis that is parallel to but offset from that of the input engine shaft. Because the engine shaft torque is equally split at the top and bottom corners, each gear carries a smaller amount of torque. This allows a net reduction in the size and number of gears and bearings otherwise required.

Because of the equal torque split and reduced load that must be carried by each gear, it is possible to use gears most advantageous in terms of size, weight, and cost. For example, spur gear/face gear combinations can be advantageously used, without spiral bevel gears, in the upper and lower corner-turning gear means. This reduces sensitivity to thermal changes, improves the smoothness, and decreases the complexity and cost. Such an arrangement comprises first and second concentric, counter-rotating face gears in meshing engagement with the engine shaft, concentric inner and outer vertical shafts connected to the respective face gears, and pinion gears at the lower ends of the vertical shafts in meshing engagement with a face gear connected to the driving shaft. The pinion gears at the end of the vertical face gear shafts, and the driving shaft face gear, are advantageously provided with helical teeth. The two concentric, counter-rotating vertical shafts are coupled together by bearings with thrust as well as radial capacity. The bearings advantageously couple the axial thrusts from one shaft to the other so that if one shaft has more torque than the other, the resulting unbalanced axial force will cause motion in the direction of increased load sharing, thus equalizing torque transmission through the two shafts. In this way, any inequality of torque in the face gear shafts will automatically be distributed into equality. This reduces wear on the gears.

In addition to the two pinion gears in meshing engagement with the driving shaft face gear, a third identical pinion gear can be used as a power take-off gear for an interconnect shaft for dual-engine arrangements. When two engines are used to turn two different sets of propeller blades, for example, an interconnect shaft typically couples the two output shafts together, such that failure of one engine allows the opposite engine to continue rotating both sets of propeller blades. This is an added safety feature, and is required by many governmental agencies for aircraft certification. A spur gear train can advantageously be used to position the interconnect shaft at any desired location for maximum efficiency within the aircraft configuration. The spur gears for the interconnect shaft can be used to drive accessories. Alternatively, an internal spur gear located just inside the output face gear can drive accessories mounted on the rear face of the gear box. The design of the engine nacelle will dictate the precise accessory location.

A novel offset gear transmission in accordance with the present invention reduces the number of gears and bearings that would otherwise be necessary to provide an offset torque path. Two corner-turning gear arrangements connected to two concentric, counter-rotating shafts provide smooth operation and reduced complexity and weight. Using spur gears and counter-rotating face gears reduces the number of parts necessary, increases the tolerance for thermal growth and deflection of the gears, reduces noise and vibration, and increases the efficiency of the gear arrangement. For example, the driving portion of a gearbox using the present invention typically contains six gears and four bearings.

Other features and advantages of the present invention should be apparent on the following description of the preferred embodiment, which illustrates, by way of example, the principles of the invention.

DESCRIPTION OF THE PREFERRED EMBODIMENTS

The following description of the preferred embodiments of the invention is not to be taken in a limiting sense, but is made merely for the purpose of illustrating the general principles of the invention. The following detailed description is of the best presently contemplated modes of carrying out the present invention.

Figure 1:
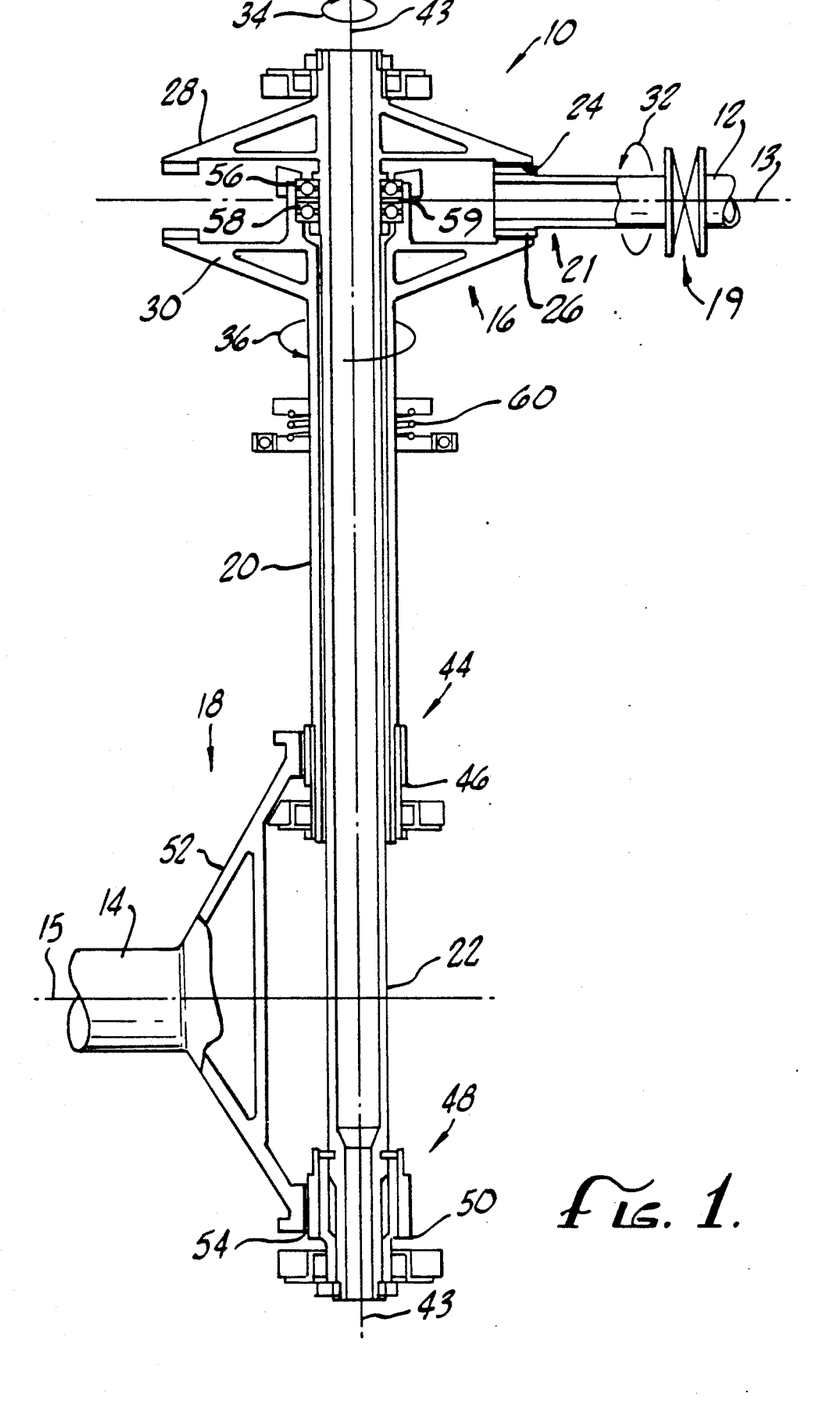
FIG. 1 is a perspective view of a gear arrangement in accordance with the present invention.

The gear arrangement 10 shown in FIG. 1 is constructed in accordance with the principles of the present invention, and transfers torque from an input engine shaft 12 rotating about a first axis 13 to an output drive shaft 14 rotating about an offset but parallel second axis 15. The engine shaft transmits its torque through an angle of approximately 90° by means of an upper spur/face gear combination 16, and transmits its torque through another angle of approximately 90° by means of a lower spur/face gear combination 18. The upper and lower spur/face gear combinations are coupled together through two concentric, counter-rotating shafts 20 and 22. The torque from the input engine shaft 12 is equally split and coupled by the upper gear combination 16 to the two counter-rotating shafts. The lower gear combination 18 combines the torque from the two shafts 20 and 22, and transmits the torque to the output shaft 14. This equal splitting of the torque load allows the associated gear arrangements to be smaller, lighter, and less complex than otherwise.

Figure 2:
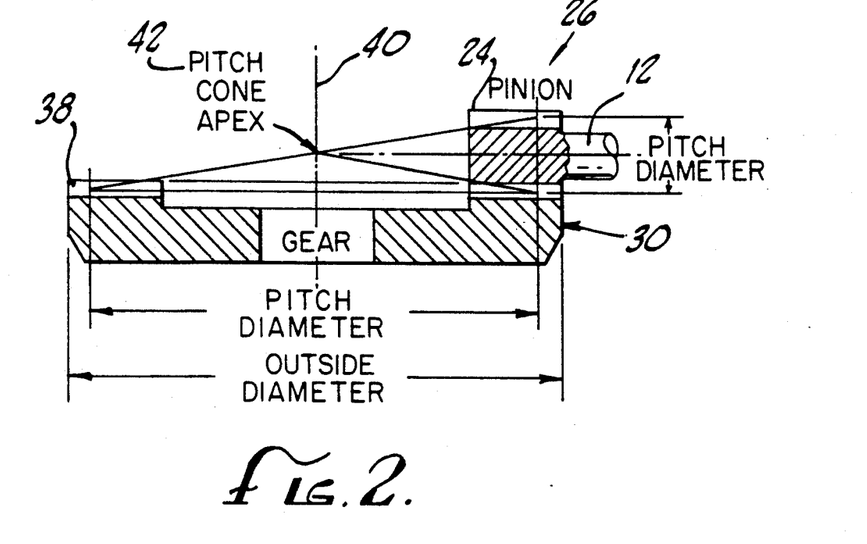
FIG. 2 is a cross-sectional view of the face gears illustrated in FIG. 1.
Figure 3:
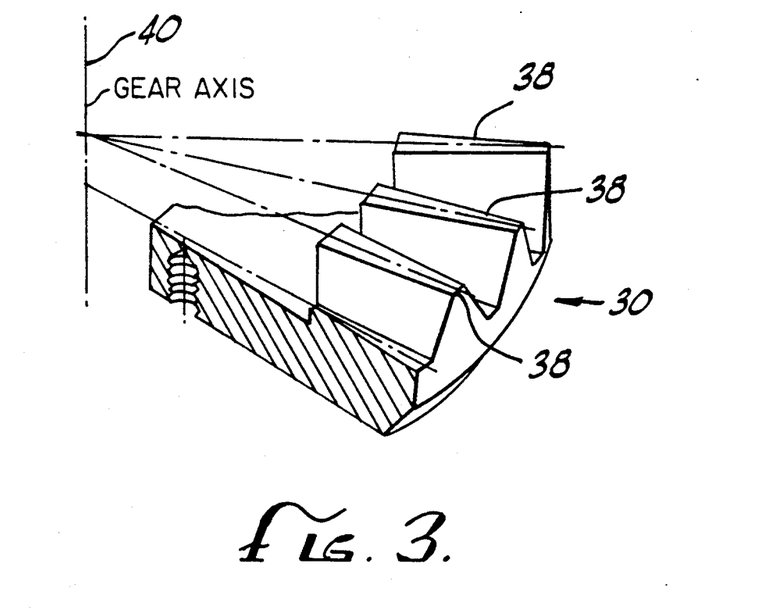
FIG. 3 is a perspective view of one of the face gears illustrated in FIG. 1.

At the upper gear combination 16, the torque from the engine shaft 12 is transferred through a flexible coupling 19 to a pinion shaft 21. The torque from the pinion shaft 21 is split to the two vertical shafts 20 and 22 through a spur/face gear combination. Thus, the advantages of spur/face gear combinations can be exploited. One end of the pinion shaft 21 is provided with straight gear teeth 24 whose edges are parallel to the shaft axis of rotation, forming a pinion gear 26. The pinion gear is in meshing engagement with a first upper face gear 28 and a second upper face gear 30. The two face gears rotate in opposite directions. For example, with the engine shaft rotating in the direction of the arrow 32 in FIG. 1, the direction of rotation for the first and second face gears is as indicated by the arrows 34 and 36, respectively, in FIG. 1. The flexible coupling 19 permits the pinion shaft 21 and the pinion gear 26 to float so as to provide automatic and flexible balancing between the two torques transferred respectively from the pinion gear to the two face gears 28 and 30 with which it is engaged. Many other arrangements are known to those skilled in the art for ensuring that the pinion gear 26 is free floating. For example, the flexible coupling may be substituted by a duplex pair of ball bearings mounted face-to-face to provide a pivot point. Alternatively, a crowned splined coupling may be used. By using a flexible coupling, a ball bearing arrangement, a crowned splined coupling or other similar means, the position of the pinion gear is permitted to automatically adjust between the face gears so that the two torques transferred to the face gears are substantially identical. As shown in FIGS. 2 and 3, the face gears are provided with generally radially directed teeth 38 and rotate about a gear axis 40 such that the gear axis of each face gear intersects the pitch cone apex 42 of the pinion 26. While only one face gear 30 is illustrated in FIGS. 2 and 3, it is to be understood that the other face gear 28 is similarly configured.

Returning to FIG. 1, the second face gear 30 is connected to the rotating, longitudinally extending outer face gear shaft 20, while the upper face gear 28 is connected to the longitudinally extending inner face gear shaft 22. The gears may be connected to the shafts by splines or by welding, for example, or the two can be part of a single forging. The outer face gear shaft is a hollow tube having a diameter greater than that of the inner face gear shaft and, while the two shafts rotate about the same axis 43, the inner face gear shaft rotates within the outer face gear shaft and in an opposite direction. It should be apparent that the face gears rotate about an axis that is at an angle of approximately 90° from the first axis 13. That is, a pinion gear and paired face gear combination is used to turn the corner, in the manner described in U.S. patent application Ser. No. 07/478,677 by the present inventor, which is incorporated herein by this reference.

At the lower gear combination 18, the torque from each of the vertical face gear shafts 20 and 22 is combined and transmitted to the output drive shaft 14 by means of a helical/face gear combination. Again, this provides a simpler construction with improved performance over spiral bevel gears. The bottom of the outer shaft 20 is provided with a pinion 44 having gear teeth 46 in a helical pattern. The inner shaft 22 is also provided with a pinion 48 having helical gear teeth 50 with the same pitch, and extends outwardly beyond the outer shaft 20. The outer shaft pinion 44 and inner shaft pinion 48 are in meshing engagement with an output face gear 52 that is provided with helical teeth 54. The face gear is connected to the drive shaft 14. Because the inner and outer shaft pinions 44 and 48, and the drive shaft face gear 52, all have helical teeth, thrust forces will be generated along the vertical shaft axes.

The axial forces generated by virtue of the helical gears are used to maintain an approximately even torque split between the two vertical shafts 20 and 22. A pair of thrust bearings 56 and 58 are used to couple the axial forces from one vertical shaft to the other. Because the shafts end in helical pinion gears 44 and 48, axial thrust is developed along the shafts as the torque is transmitted from the input engine shaft 12 to the output drive shaft 14. The thrust bearings transmit these forces and, in conjunction with the spur/face gear combinations, equalize the torque. For example, if a force from the outer pinion 44 pushes the outer shaft 20 upwardly, the axial thrust is transmitted through the thrust bearings 56 and 58, and then is applied through the inner shaft 22 to the other helical pinion 48 to also push it and the inner shaft upwardly, which causes its share of the torque to increase. Thus, the thrust bearings couple the axial forces from the pinion gears 44 and 48 through the shafts 20 and 22. In this way, if one pinion gear is momentarily carrying more torque than the other, the thrust bearings will help equalize the load.

In the FIG. 1 embodiment, the thrust bearings 56 and 58 are a duplex pair that are pre-loaded together. That is, there is no free play between the bearings and they therefore have a rapid response to axial thrust. To achieve this, it is necessary to provide the minimal amount of internal clearance. The duplex pair thrust bearings are mounted back to back and are preloaded together to provide precise response motions. A spacer 59, however, may be provided between the thrust bearings for the passage of oil.

While the torque between the two vertical shafts 20 and 22 is transferred back and forth, care must be taken not to allow too quick a response to unequal distribution, a response characterized as statically indeterminant. A preload spring 60 may be advantageously provided to prevent the helical pinion gears 44 and 48 from being in a statically indeterminant condition, where a perfectly even split of torque between the pinion gears can result in hunting between the two shafts during operation of the gear arrangement 10. That is, it will be impossible to maintain a perfectly even fifty/fifty distribution of torque between the two pinion gears at all times. More particularly, if the gears are perfectly balanced when operation begins, the inevitable slight imbalance in the torque distribution between the pinion gears 44 and 48 will result in an equalizing axial thrust being transmitted through the thrust bearings 56 and 58. An over-travel response will result in another slightly unequal distribution of torque, which can result in a compensating slight axial thrust being transmitted in the opposite direction from one shaft to the other through the thrust bearings. This process can be repeated, causing an oscillation or hunting between the two shafts.

The preload spring 60 biases the torque split between the two vertical shafts 20 and 22 to be slightly uneven, such as a 50.3/49.7 torque split, and damps any minor oscillation in the torque split. This biased torque split puts the gears 44 and 48 in a statically determinant condition, and therefore there is less chance of hunting in the torque split during operation. This eliminates the oscillation, and ensures determinant balance between the shafts. Alternatively, a spring/damper combination or a damper alone may be used to prevent hunting.

Figure 4:
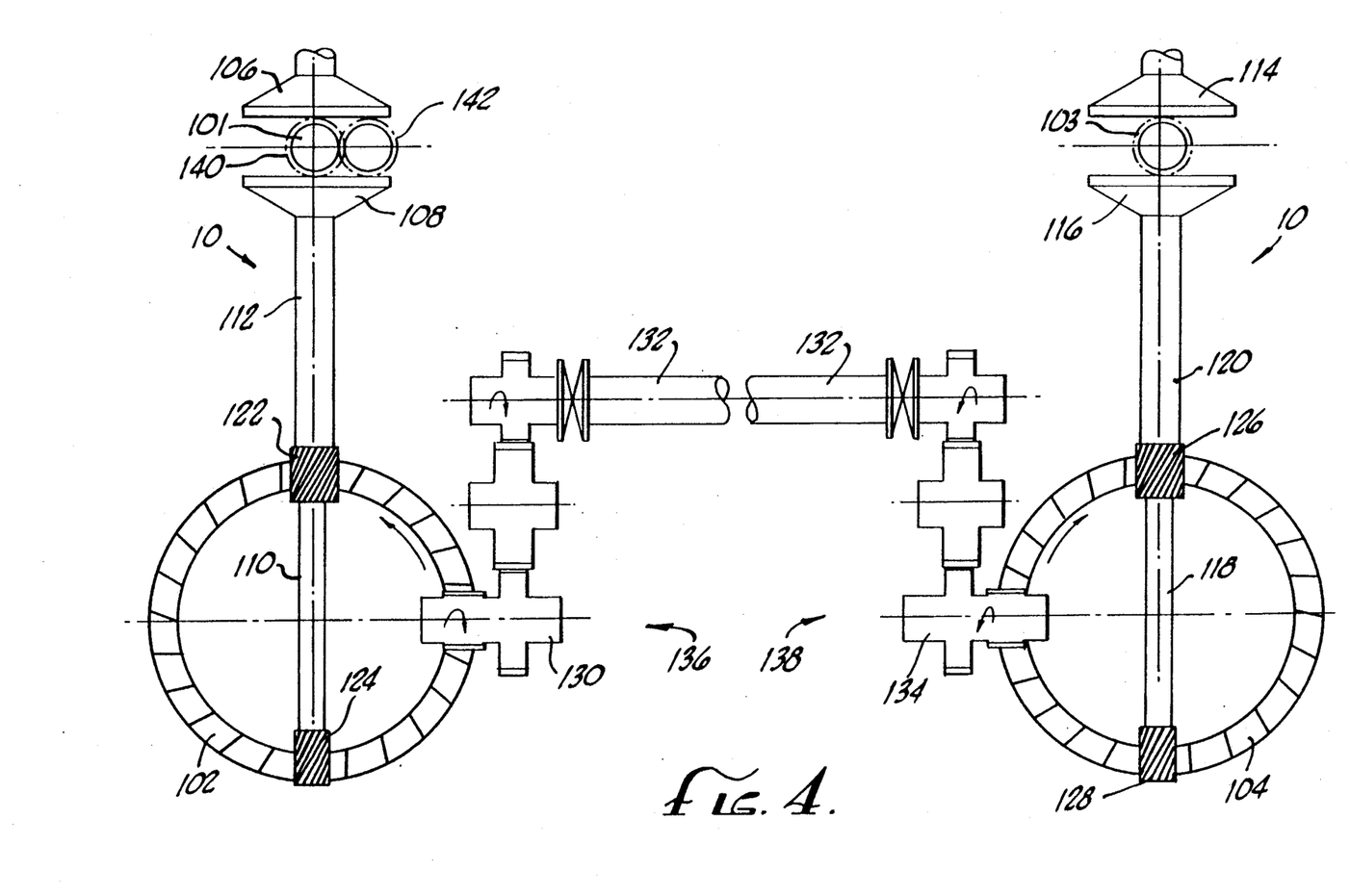
FIG. 4 is a cross-sectional view of a dual engine gear arrangement in accordance with the present invention.

The dual engine arrangement shown in FIG. 4 uses two gear arrangements constructed in accordance with the present invention to transmit power from two different engines to separate sets of output shafts to drive, for example, first and second sets of propellers. The two sets of propellers can be interconnected such that both rotate even if one engine fails. In particular, an input shaft 101 from a first engine (not illustrated) is coupled through a gear arrangement 10 such as illustrated in FIG. 1 (rotated through 90°) to a left side helical output face gear 102. A second engine (not illustrated) is coupled by its engine input shaft 103 through a similar gear arrangement 10 to a right side helical output face gear 104.

The first input shaft 101 transmits torque through first upper 106 and lower 108 face gears to left inner 110 and outer shafts 112, respectively. A similar arrangement is provided for the right engine, where second upper 114 and lower 116 face gears allow the second input shaft 103 to transmit torque to right inner 118 and outer 120 shafts, respectively. Therefore, the left helical output face gear 102 is in meshing engagement with a first helical pinion 122 attached to the left outer face gear shaft 112 and with a second helical pinion 124 attached to the left inner face gear shaft 110, while the right helical output face gear 104 is in meshing engagement with a third helical pinion 126 and a fourth helical pinion 128 attached to the right outer 120 and inner 118 face gear shafts, respectively. The teeth of the output face gears rotate in a plane parallel to the face gear shafts axes of rotation.

As noted, the two engines can be interconnected for safer operation in the event of engine failure. For this purpose, a left take-off helical pinion 130 is in meshing engagement with the left helical output face gear 102 and is used as the power take-off for an interconnect shaft 132. Similarly, a right take-off helical pinion 134 is in meshing engagement with the right helical output face gear 104 and is in turn coupled to the interconnect shaft 132

From the left input shaft 101, power is transmitted from the face gear shafts 110 and 112 to the output face gear 102 and take-off pinion 130 through a gear train 136 to the interconnect shaft 132. Power is also transmitted from the right input shaft 103 through the face gear shafts 118 and 120 to the right helical output face gear 104 and take-off pinion 134 through a gear train 138 to couple torque to the interconnect shaft 132. The interconnect shaft is required by many governmental safety regulations. The interconnect shaft is used, for example, to connect two sets of propellers each driven by a separate engine, such that one engine alone can drive both propellers should one engine fail. In this way, failure of one engine won't completely disable the aircraft, and both sets of propellers will continue to turn.

The gear trains 136 and 138 used in routing power from the output face gears 102 and 104 to the interconnect shaft 132 are parallel axis gears used for gear reduction and for locating the interconnect shaft. Thus, the position of the interconnect shaft relative to the output face gears can be adjusted by varying the size of the gear trains. Because helical face gears are used as the output gears, the gear trains routing power to the interconnect shaft can be made very compact and with the minimal number of parts. If spiral bevel gears had been used instead of the output face gears, it would be necessary to combine planetary gears and gear reduction stages, all of which would take up more space and limit the number of options available in locating the interconnect shaft. Thus, the present invention maximizes the freedom of the designer in placing the interconnect shaft relative to the output shafts.

All engines for a particular model aircraft will usually be interchangeable and will therefore rotate in the same direction, but under some dual engine applications the propellers must turn in opposite directions to deal with gyroscopic and backwash propeller effects. In such a dual-engine arrangement, therefore, the propellers on either side of the fuselage must turn in opposite directions. A reversing mesh gear can be provided for this purpose. Under such circumstances, the gear arrangement input shaft 101 is provided with a reversing gear 140 that is in meshing engagement with the engine drive shaft 142. That is, one end of the input shaft 101 is in meshing engagement with the face gears 106 and 108, while another portion of the shaft longitudinally displaced from the face gears is in meshing engagement with the engine drive shaft 142. In this way, the reverse gear 140 provides the counter rotation needed to turn the propellers in opposite directions.

Figure 5:
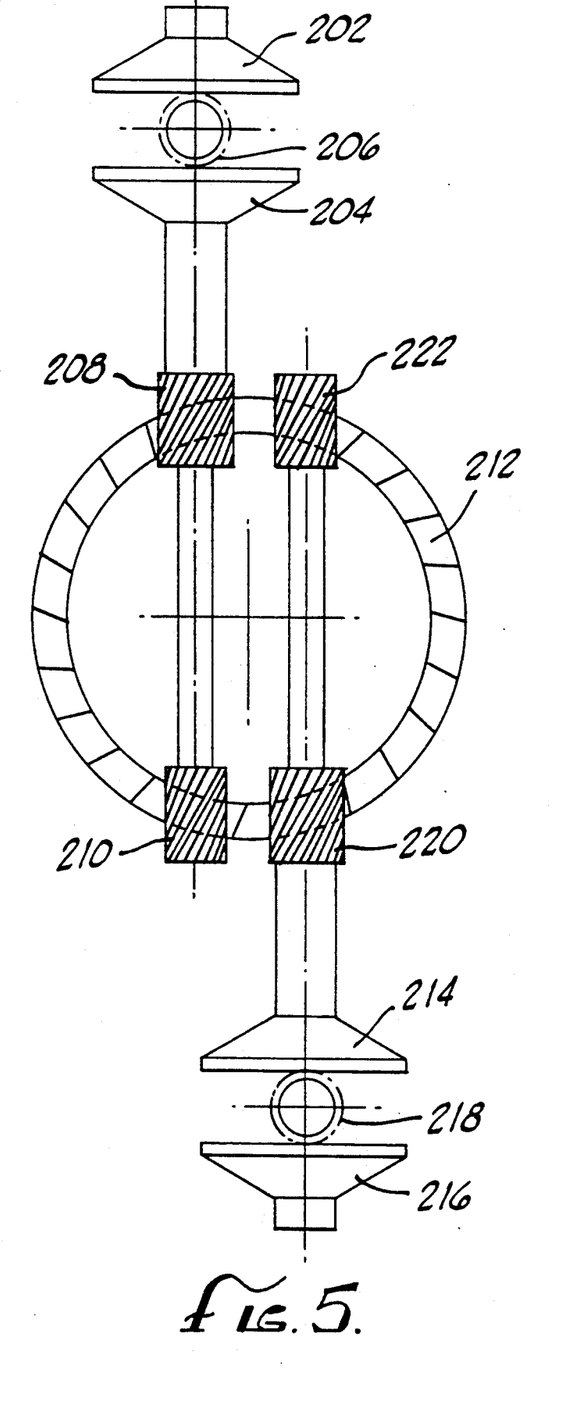
FIG. 5 is a cross-sectional view showing two engines driving a single output face gear.

A method of combining two engines to drive a single output face gear is illustrated in FIG. 5, in which a first upper face gear 202 and a second upper face gear 204 are driven by a first engine shaft 206. Hypoid pinions 208 and 210 that are driven by the second 204 and first 202 upper face gears, respectively, mesh with an output face gear 212. Similarly, a first lower face gear 214 and a second lower face gear 216 are driven by a second engine shaft 218, and hypoid pinions 220 and 222 that are driven by the first 214 and second 216 lower face gears, respectively, mesh with the output face gear 212. By using hypoid pinions, a more compact arrangement of two engines driving a single output face gear can be achieved, while providing the other benefits of the drive train as described above.

In accordance with the present invention, an offset transmission is provided that transmits torque from an input engine shaft to an output driving shaft at an offset axis using two corner-turning gear arrangements that first divide the torque between two gear wheels and then combine it, and that are connected by two concentric, counter-rotating shafts. The corner-turning gear arrangements advantageously comprise spur/face gear combinations for smooth, quiet operation and good tolerance to thermal expansion and deflection. The number of gears and bearings used can be reduced by almost one-half when compared with conventional offset transmissions. This provides lower cost, greater reliability, reduced weight, and greater flexibility in locating the various gear wheels and accessory drives. A helical output face gear and helical pinions can be used with thrust bearings to couple the output shafts together to advantageously split the torque between the two pinions. A preload spring can be provided to ensure that the pinion gears are statically determinant, thus reducing the chance of oscillation in torque splitting. Finally, the gear train used to couple two engines together with an interconnect shaft can be advantageously designed to locate the interconnect shaft as desired, without the complexity and added weight of a spiral bevel gear and planetary gear arrangement.

While the present invention has been described with respect to a preferred embodiment, it is to be understood that variations may occur to those skilled in the art. The number of gears used and the materials with which they are constructed, for example, can be varied without departing from the teachings of the present invention. While spur/face gears are preferred for the upper gear combination, other types of gear arrangements for turning the corner can be used and will occur to those skilled in the art. Furthermore, the invention can be applied to a variety of offset transmission applications, such as heavy machinery, rotary wing aircraft, and naval vessels without departing from the teachings of the present invention. The invention, therefore, should not be seen as limited to the particular apparatus and method described herein, but it should be understood that the present invention has wide applicability with respect to offset transmissions of different configurations. Such alternate configurations can be achieved by those skilled in the art in view of the description herein.

I claim:

1. A gear arrangement for transmitting torque from an input shaft rotating about a first axis to an output shaft rotating about a second axis parallel and offset from the first axis, the gear arrangement comprising:
   upper gear means in meshing engagement with the input shaft for transmitting torque from the input shaft through an angle and for dividing the torque into a first portion and a second portion;
   lower gear means in meshing engagement with the output shaft for receiving the first torque portion and the second torque portion from the upper gear means, for combining the two torques, and for transmitting the torque through an angle to the output shaft; and
   transmitting shaft means coupled to the upper gear means and the lower gear means for transmitting the first and second torque portions from the upper gear means to the lower gear means, wherein the transmitting shaft means comprises first and second concentric counter-rotating shafts.

2. A gear arrangement for transmitting torque from an input shaft rotating about a first axis to an output shaft rotating about a second axis parallel and offset from the first axis, the gear arrangement comprising:
   upper gear means in meshing engagement with the input shaft for transmitting torque from the input shaft through an angle and for dividing the torque into a first portion and a second portion;
   lower gear means in meshing engagement with the output shaft for receiving the first torque portion and the second torque portion from the upper gear means, for combining the two torques, and for transmitting the torque through an angle to the output shaft; and
   transmitting shaft means coupled to the upper gear means and the lower gear means for transmitting the first and second torque portions from the upper gear means to the lower gear means, wherein
   an output face gear is coupled to the output shaft; and
   the upper gear means comprises:
      a first upper face gear in meshing engagement with the input shaft;
      a second upper face gear in meshing engagement with the input shaft, concentric with the first upper face gear and rotating in a direction opposite thereto, and
   the lower gear means comprises:
      a first lower helical pinion gear in meshing engagement with the output face gear, and
      a second lower helical pinion gear in meshing engagement with the output face gear, and concentric with the first lower helical pinion gear and rotating in a direction opposite thereto.

3. A gear arrangement as recited in claim 2, wherein the transmitting shaft means comprises:
   a first shaft coupled to the first upper face gear and the first lower helical pinion gear; and
   a second shaft concentric with the first shaft and coupled to the second upper face gear and the second lower helical pinion gear.

4. A gear arrangement as recited in claim 3, further including thrust bearing means for coupling the first shaft and the second shaft such that axial force from one shaft is coupled to the other shaft, generating a like axial force on the other shaft, and the torque carried by the shafts tends to be equalized.

5. A gear arrangement as recited in claim 4, further including preload spring means for biasing the first lower helical pinion gear and second lower helical pinion gear into an unequal split of torque between the first shaft and second shaft so as to place the two pinion gears in a statically determinant condition.

6. A gear arrangement for transmitting torque from an input shaft rotating about a first axis to an output shaft rotating about a second axis parallel and offset from the first, the gear arrangement comprising:
   a first upper face gear in meshing engagement with the input shaft;
   a second upper face gear in meshing engagement with the input shaft;
   an inner face gear shaft connected to the first upper face gear and rotating about an axis perpendicular to the first axis;
   an outer face gear shaft connected to the second upper face gear and rotating about an axis perpendicular to the first axis in a direction counter to that of the inner face gear shaft;
   an inner face gear shaft pinion located at the lower end of the inner face gear shaft;
   an outer face gear shaft pinion located at the lower end of the outer face gear shaft; and
   an output face gear in meshing engagement with the inner face gear shaft pinion and the outer face gear shaft pinion.

7. A gear arrangement as recited in claim 6, wherein the outer face gear shaft rotates outside the inner face gear shaft, and further including thrust bearing means for coupling the outer face gear shaft and the inner face gear shaft such that axial force from one shaft is coupled to the other shaft, generating equal and opposite axial force on the other shaft and therefore substantially equalizing the torque split between the two shafts.

8. A gear arrangement as recited in claim 7, further including preload spring means for biasing the inner face gear shaft pinion and outer face gear shaft pinion into an unequal split of torque between the inner face gear shaft and outer face gear shaft so as to place the two pinions in a statically determinant condition.

9. A gear arrangement as recited in claim 6, wherein the inner face gear shaft pinion and outer face gear shaft pinion, and the output face gear, are provided with helical gear teeth.

10. A gear arrangement for transmitting torque from a first engine output shaft to a first propeller drive shaft parallel and offset from the first engine output shaft, the gear arrangement comprising:
   a first engine pinion gear located at the end of the engine output shaft having teeth whose edges are disposed parallel to the output shaft axis of rotation;
   a first upper face gear having a top surface and a bottom surface, with radial teeth disposed along the periphery of the bottom surface in meshing engagement with the first engine pinion gear;

a second upper face gear having a top surface and a bottom surface, with radial teeth disposed along the periphery of the top surface in meshing engagement with the first engine pinion gear;

a vertically oriented first upper face gear shaft connected to the first upper face gear and having a pinion at its lower end with teeth whose edges are parallel to the first upper face gear shaft axis of rotation;

a vertically oriented second upper face gear shaft connected to the second upper face gear having a pinion at its lower end with teeth whose edges are parallel to the second upper face gear shaft axis of rotation; and a first output face gear having a meshing surface with radial teeth disposed along the periphery in meshing engagement with the first upper face gear shaft pinion and the second upper face gear shaft pinion, and connected to the first propeller drive shaft.

11. A gear arrangement as recited in claim 10, wherein the first upper face gear shaft pinion and second upper face gear shaft pinion and the first output face gear are provided with helical teeth.

12. A gear arrangement as recited in claim 10, further including bearing means for rotatably supporting the first upper face gear shaft and second upper face gear shaft, and for coupling axial torque generated in one shaft to the other.

13. A gear arrangement as recited in claim 10, further including first thrust bearing means for coupling the first upper face gear shaft and the second upper face gear shaft such that any imbalance in torque split generates an equal and opposite axial force on the other shaft to substantially equalize the torque split between the two shafts.

14. A gear arrangement as recited in claim 13, further including first preload spring means for biasing the first upper face gear shaft pinion and second upper face gear shaft pinion into an unequal split of torque between the first upper and second upper face gear shafts so as to place the first upper face gear shaft pinion and second upper face gear shaft pinion in a statically determinant condition.

15. A gear arrangement as recited in claim 10, further including:

a second engine output shaft rotating in a second axis, parallel to the first engine output shaft axis, having a second engine pinion gear at its end with teeth whose edges are parallel to the second engine output shaft axis of rotation;

a third upper face gear having a top surface and a bottom surface, with radial teeth disposed along the periphery of the bottom surface in meshing engagement with the second engine pinion gear;

a fourth upper face gear having a top surface and a bottom surface, with radial teeth disposed along the periphery of the top surface in meshing engagement with the second engine pinion gear;

a vertically oriented third upper face gear shaft connected with the third upper face gear and having a pinion at its lower end with teeth whose edges are parallel to the third upper face gear shaft axis of rotation;

a vertically oriented fourth upper face gear shaft connected to the fourth upper face gear, having a pinion at its lower end with teeth whose edges are parallel to the fourth upper face gear shaft axis of rotation;

a second output face gear having a meshing surface with radial teeth disposed along the periphery in meshing engagement with the third upper face gear shaft pinion and the fourth upper face gear shaft pinion; and an interconnect shaft in meshing engagement with the first output face gear and the second output face gear.

16. A gear arrangement as recited in claim 15, further including:

a first power take-off pinion in meshing engagement with the first output face gear;

a second power take-off pinion in meshing engagement with the second output face gear; and gear train means for coupling the first power take-off pinion and the second power take-off pinion to the interconnect shaft.

17. A gear arrangement as recited in claim 15, further including second thrust bearing means for coupling the third upper face gear shaft and the fourth upper face gear shaft such that any imbalance in torque split generates an equal and opposite axial force on the other shaft to substantially equalize the torque split between the two shafts.

18. A gear arrangement as recited in claim 17, further including second preload spring means for biasing the third upper face gear shaft pinion and fourth upper face gear shaft pinion into an unequal split of torque between the third and fourth upper face gear shafts so as to place the the third upper face gear shaft pinion and fourth upper face gear shaft pinion in a statically determinant condition.

* * * * *